United States Patent [19]
Fohl

[11] 3,935,618
[45] Feb. 3, 1976

[54] CLOSURE FOR SAFETY BELTS

[76] Inventor: Artur Föhl, Schelmenwasenstr. 68, 7061 Haubersbronn, Germany

[22] Filed: June 17, 1974

[21] Appl. No.: 480,029

[30] Foreign Application Priority Data
June 20, 1973 Germany............... 7322931[U]

[52] U.S. Cl............................................. 24/230 AL
[51] Int. Cl.²........................................... A44B 11/26
[58] Field of Search...... 24/211 N, 230 NP, 230 SC, 24/230 SL, 230 AL, 230 AK, 230 AN, 230 R

[56] References Cited
UNITED STATES PATENTS

| | | | |
|---|---|---|---|
| 1,490,451 | 4/1924 | Brown | 24/136 A |
| 3,203,065 | 8/1965 | Hoppenstand | 24/230 AL |
| 3,252,196 | 5/1966 | Ries | 24/230 AN |
| 3,623,194 | 11/1971 | Claeson et al. | 24/211 N |

*Primary Examiner*—Donald A. Griffin
*Attorney, Agent, or Firm*—Walter Becker

[57] ABSTRACT

A closure, or latch, especially for passenger seat belts in which a housing on the end of one belt portion has a slot for receiving a tongue on a member on the other belt portion. Within the housing are roller bodies engaging each other and spring biased toward the tongue. The tongue is provided with notch means for engagement by a roller body to effect latching while a disengaging member moveably carried by the housing is operable for moving the roller bodies into disengaging position.

8 Claims, 26 Drawing Figures

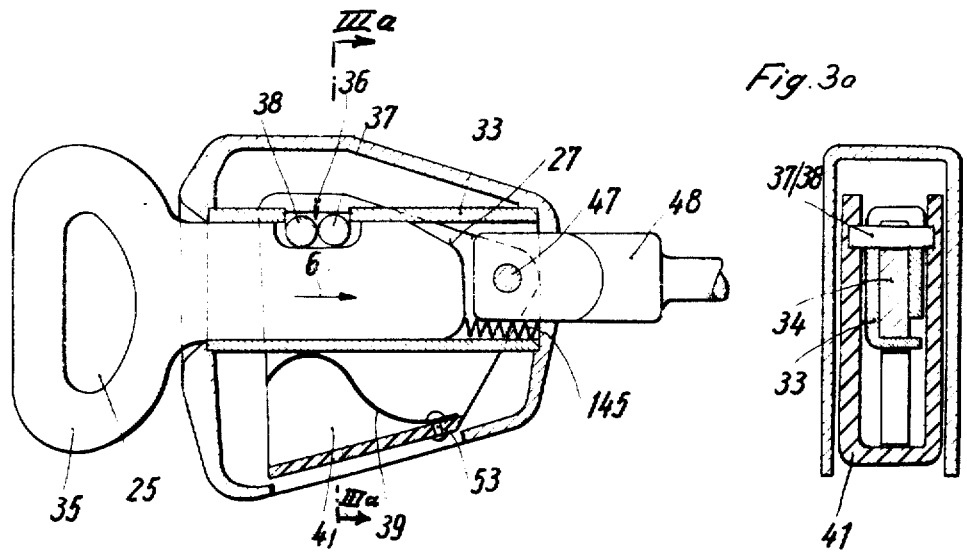
Fig.3
Fig.3a
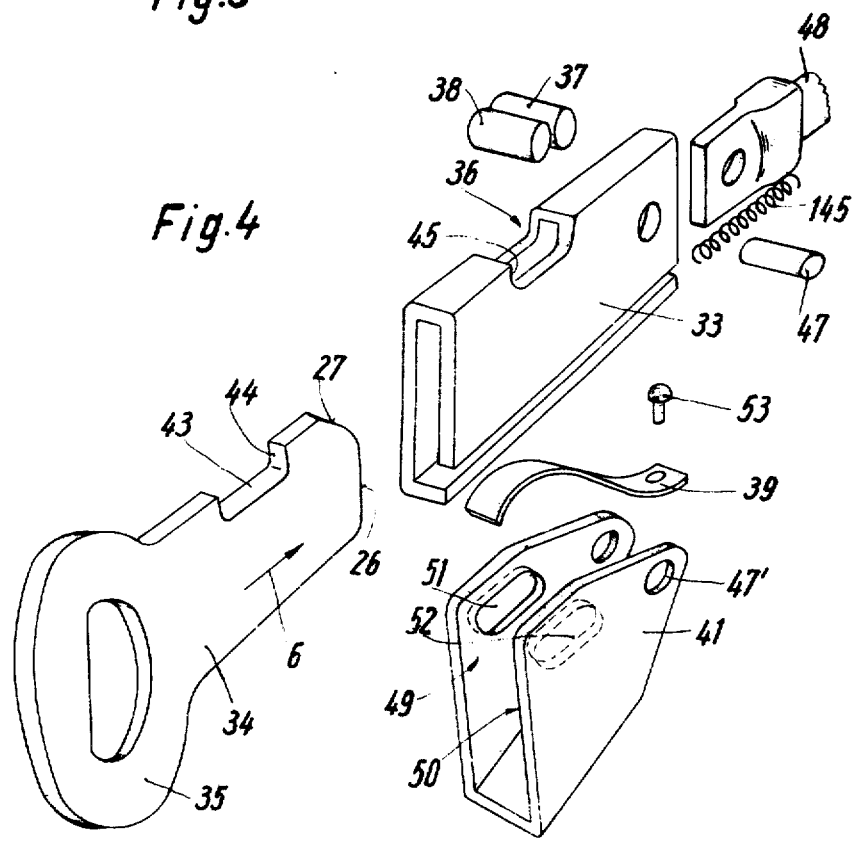
Fig.4

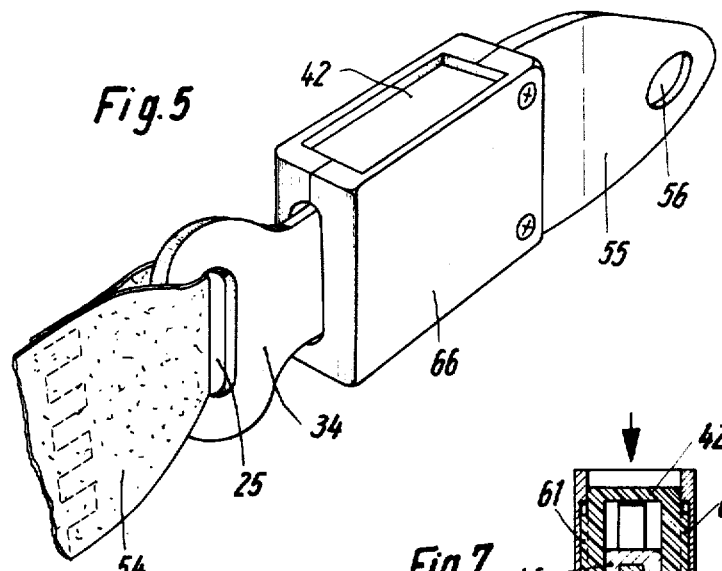
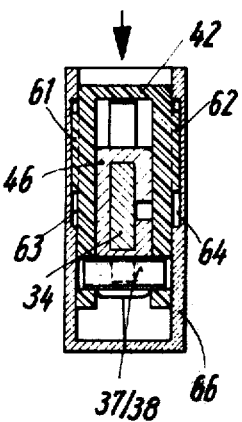
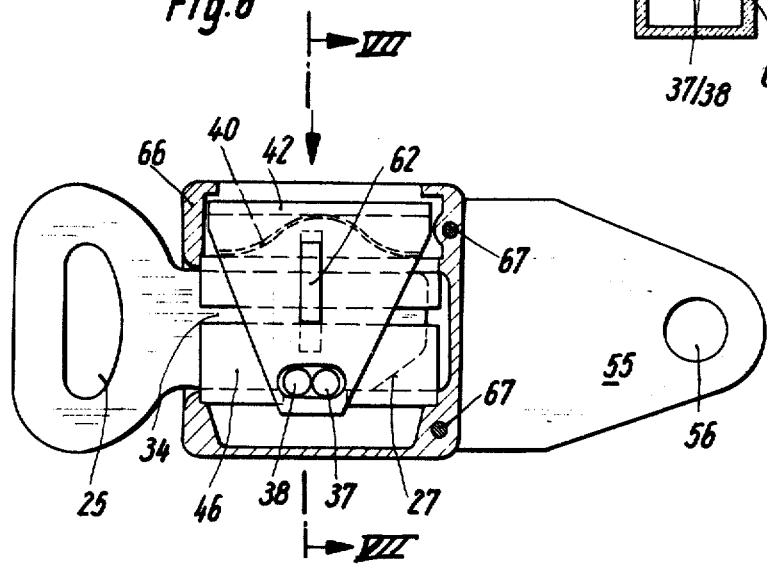

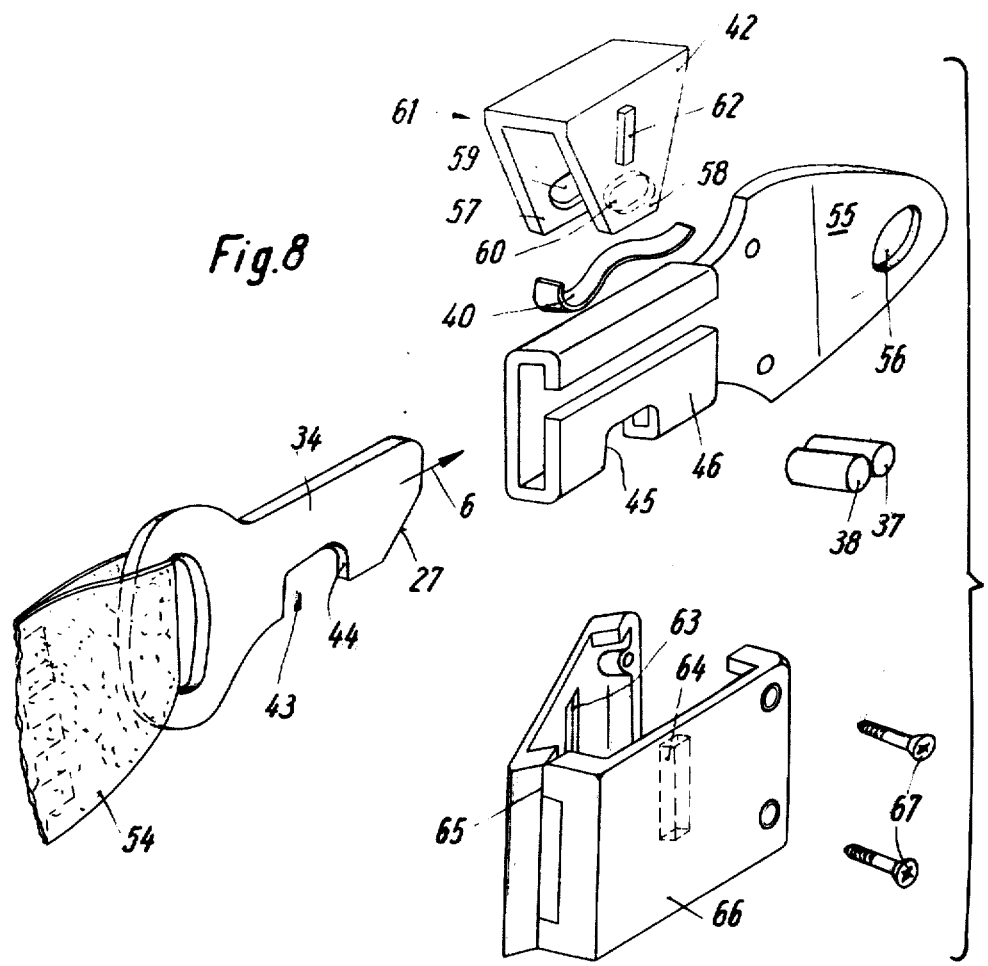

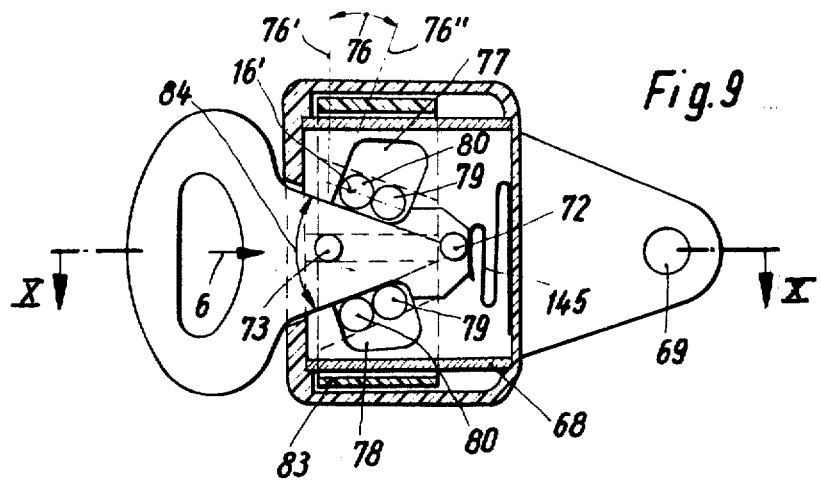
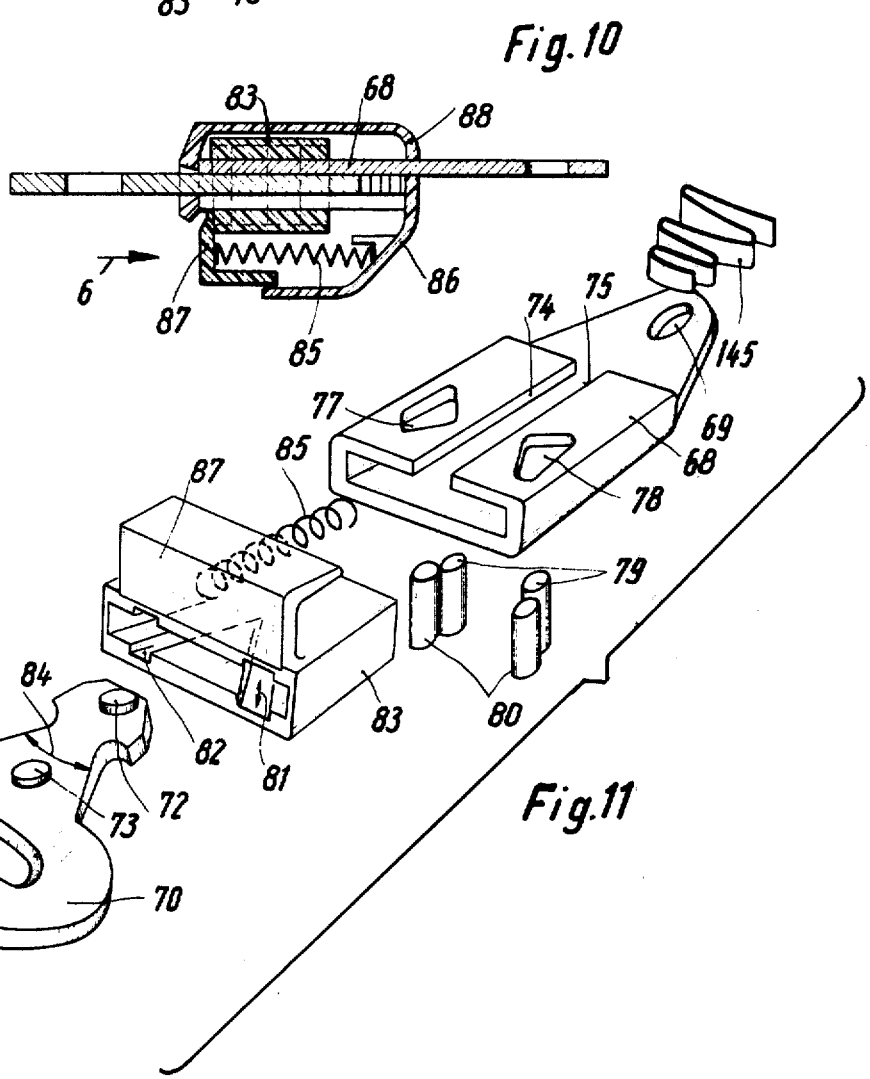

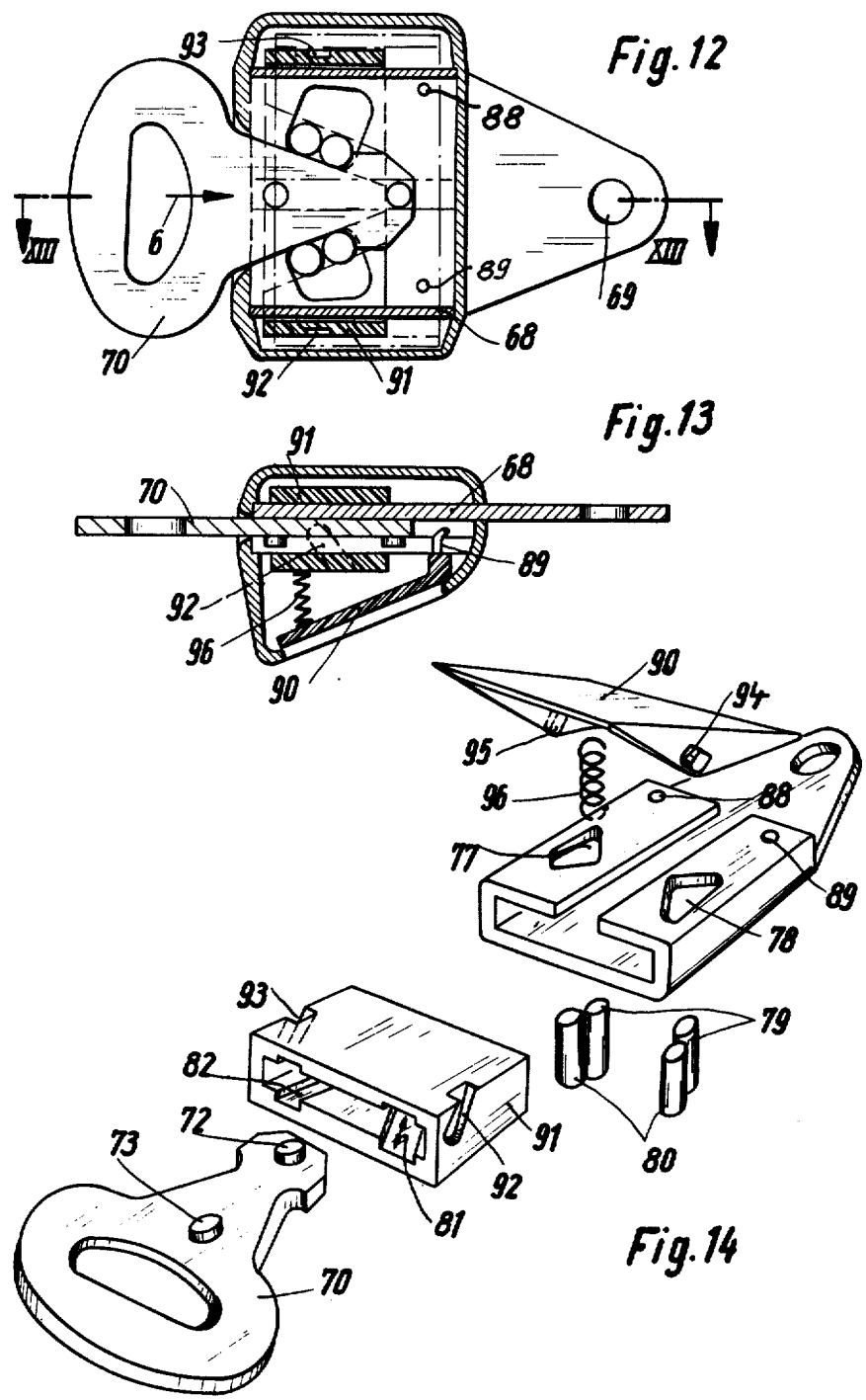

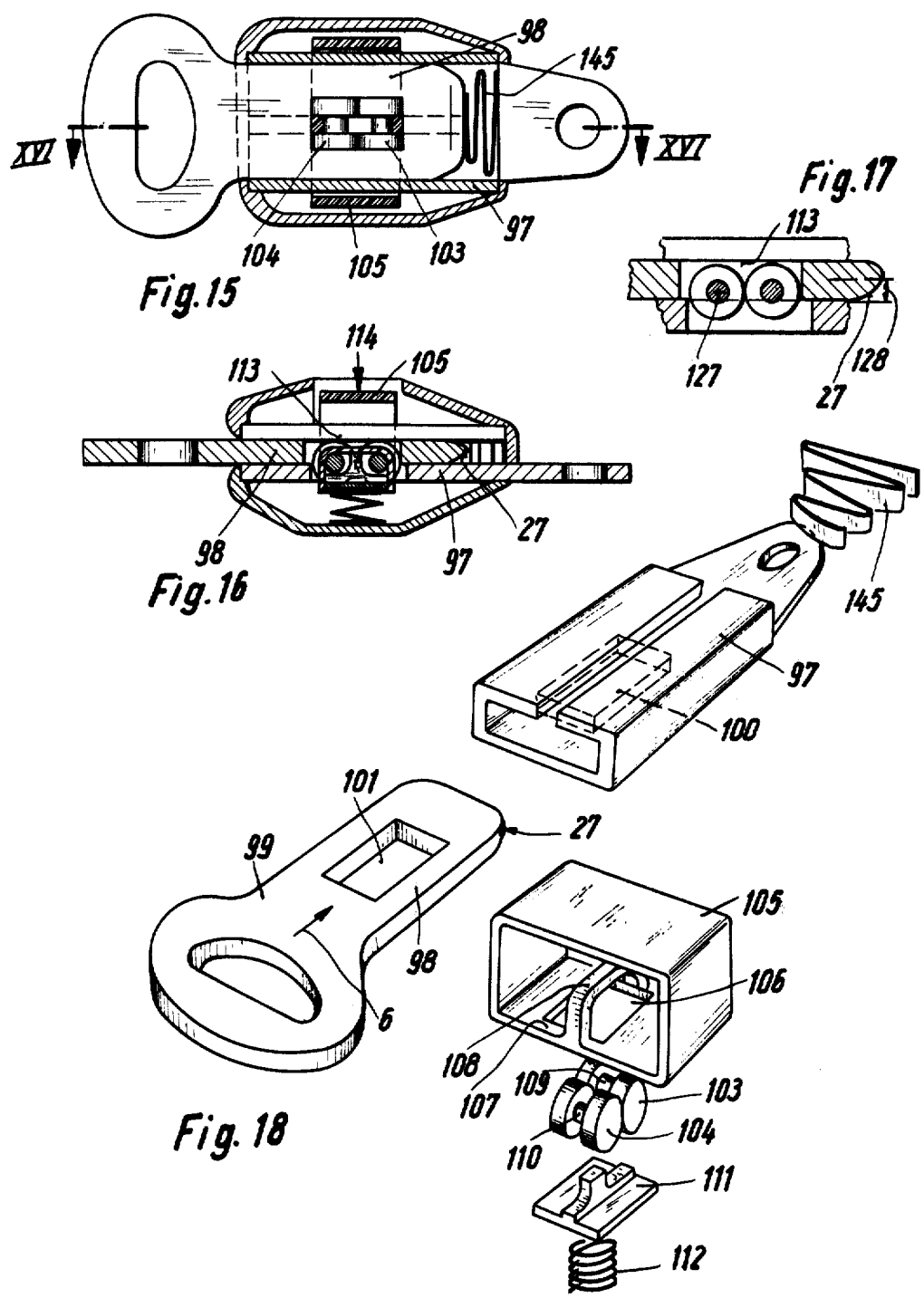

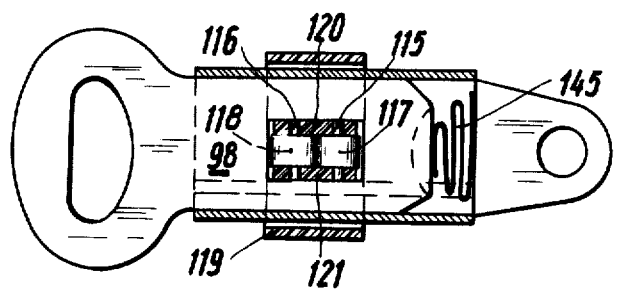
Fig. 19
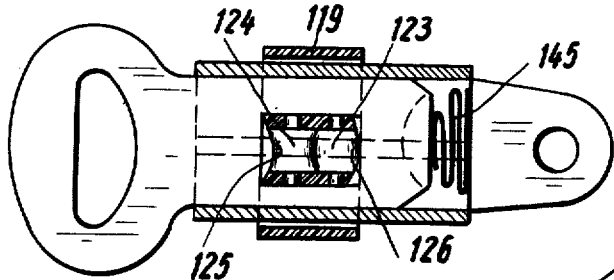
Fig. 20
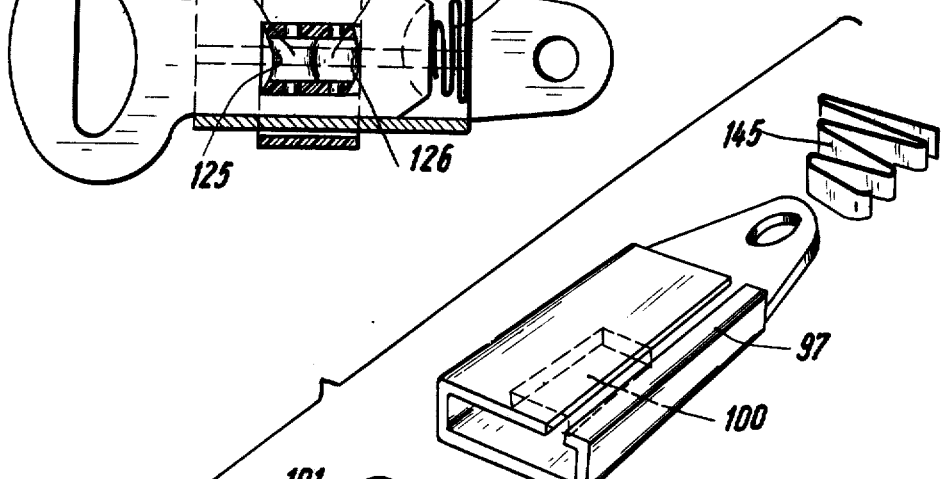
Fig. 21
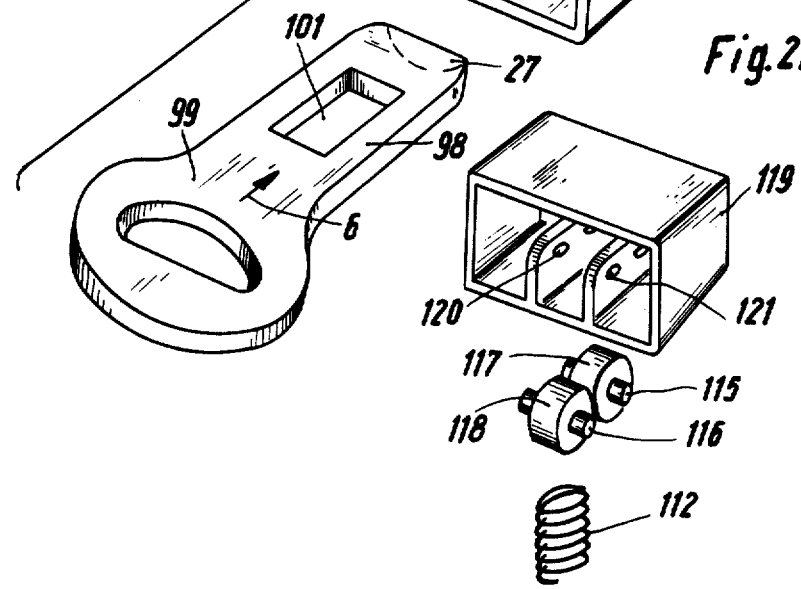

CLOSURE FOR SAFETY BELTS

The present invention relates to a closure for safety belts, especially for safeguarding vehicle passengers and airplane passengers, and comprises an insert plate which is connected to the belt and insertable into said housing, and which further comprises a spring loaded locking means between the tongue of the insert plate and the housing and which also includes a release mechanism selectively to make said locking means ineffective.

Closure means of the above mentioned general type as they have heretofore become known comprise as locking elements drop-in pins, latching slides or levers which are arranged on the housing and which when the insert plate has been inserted establish the connection of the closure. When it is desired to open said closure for instance in an emergency, a considerable opening force has to be employed because the locking elements are slideably guided in the insert tongue and in the housing, and the bearings or supporting surfaces are produced merely by punching so that the coefficient of friction which determines the magnitude of the opening force is correspondingly high.

It is, therefore, an object of the present invention to provide a closure of the above mentioned general type which will have a minimum of parts that can be produced easily and for low cost and which will have a safe locking mechanism the function of which will not be affected even by high changing tolerances.

It is also an object of this invention to provide a closure as set forth in the preceding paragraph which in case of emergency can extremely easily be opened whle utilizing only a minimum of force.

These and other objects and advantages of the invention will appear more clearly from the following specification in connection with the accompanying drawings, in which:

FIG. 3 is a longitudinal section through another embodiment according to the invention.

FIG. 3a represents a cross section through FIG. 3, said section being taken along the line IIIa—IIIa of FIG. 3.

FIG. 4 is an exploded view of the arrangement of FIG. 3 without the housing sections.

FIG. 5 illustrates an isometric view of a third embodiment according to the invention.

FIG. 6 is a partial longitudinal section of the embodiment of FIG. 5.

FIG. 7 is a cross section through FIG. 6, said section being taken along the line VII—VII of FIG. 6, FIG. 8 is an exploded view showing the individual parts of the arrangement shown in FIGS. 5, 6 and 7.

FIG. 9 illustrates a longitudinal section of a fourth embodiment of the invention, said section extending to the separating plane of the housing cups.

FIG. 10 is a section taken along the line X—X of FIG. 9.

FIG. 11 is an exploded view of the arrangement of FIGS. 9 and 10 but without the cover cups for the housing.

FIG. 12 is a longitudinal section of a fifth embodiment with pivoting pressure key, said section extending to the separating plane of the housing cups.

FIG. 13 is a section taken along the line XIII—XIII of FIG. 12.

FIG. 14 shows an exploded view of the parts arrangement of FIGS. 12 and 13.

FIG. 15 represents a sixth embodiment in a longitudinal section relative to the separating plane of the housing cups.

FIG. 16 shows a longitudinal section taken along the line XVI—XVI of FIG. 15.

FIG. 17 is a partial section through the locking elements of FIGS. 15–18.

FIG. 18 illustrates an exploded view of the arrangement of FIGS. 15 and 16 but without housing cups.

FIG. 19 represents a longitudinal section to the separating plane of the housing cups of a seventh embodiment of the invention.

FIG. 20 illustrates a longitudinal section to the separating plane of the housing cups of an eighth embodiment of the invention.

FIG. 21 is an exploded view of FIGS. 19 and 20 without housing cups.

Figure 1:
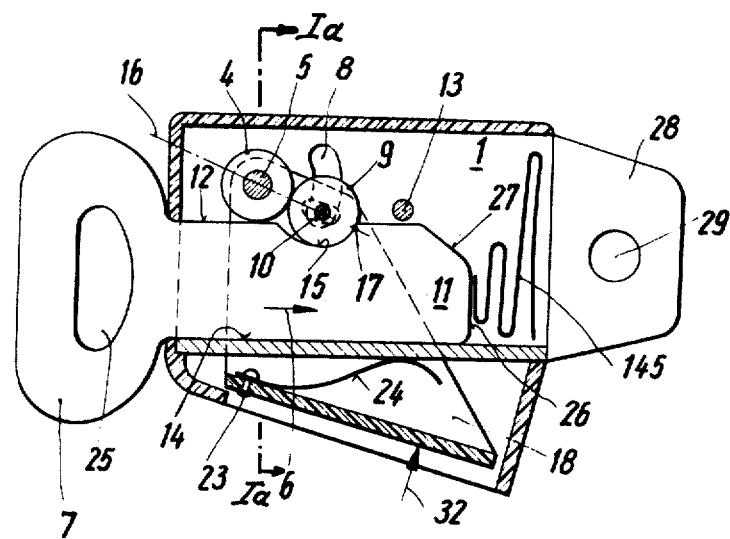
FIG. 1 illustrates a first embodiment of a safety belt closure in longitudinal section.
Figure 1A:
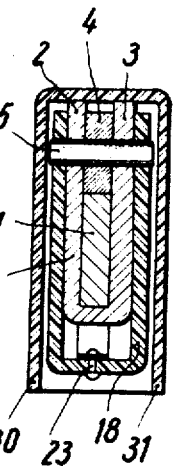
FIG. 1a shows a cross section through the safety belt closure of FIG. 1, said section being taken along the line Ia—Ia of FIG. 1.

The problem underlying the present invention has been solved according to the present invention by employing with a closure of the above mentioned type at least two antifriction bodies which serve as locking elements and which when in engaging position rest against each other and during a disengagement roll on each other while at least one rolling body is movable transverse to the insert direction of the tongue and transverse to its longitudinal axis. This arrangement makes possible that during the disengaging operation, due to the considerably smaller frictional coefficient of the rolling friction, the disengaging force is considerably less than is the case with heretofore known closure means of the type involved.

With a closure according to the invention, at least one housing recess is provided which extends approximately transverse to the feed-in direction of the tongue. The anti-friction body is with play guided in said housing recess which rolling body cooperates on one hand is operative connected to the movable disengaging means and cooperates with at least one supporting roller which is rotatably mounted in the housing and when viewed in engaging position is located in front of the tongue recess in the housing. The said supporting roller simultaneously tangentially engages the plug-in tongue over the wide side thereof. The insert tongue is counterguided on the inner longitudinal edge of the U-shaped bent housing. The tongue recess is preferably open at its rim and is provided at least so deep that in engaging position, the supporting surface extends perpendicular to the axle-connecting line, or "supporting roll-antifriction body." Preferably, however, for purposes of an easier disengagement, the tongue recess converges outwardly at an angle which is less than the angle at which self-locking occurs. In this way it will be assured that under load, only normal forces acting upon the locking means so that an absolutely safe locking will be assured. The bearing bolt for the supporting roller simultaneously serves as bearing pin for the pivotable disengaging means which is pressed into engaging position by spring means and in which the movable anti-friction body or rolling body is held with play.

A particularly simple and effective arrangement of the latching elements is obtained when the two roller bodies are formed by small cylinder rolls. For this embodiment, the housing is preferably made in one piece of a sheet metal cut, and is bent into a box shape so that the plug-in tongue of the plug-in link or plug-in member is guided on all sides with a slight play. Within the front region, the housing has a recess which extends substantially transverse to the insert direction of the tongue and is open at the rim. The roller bodies are guided in said recess and are mounted with play in the movable spring-urged disengagement mechanism. The tongue is provided with at least one recess open at its rim ad corresponding to the recess of said housing. The supporting surfaces may be provided at a desired angle rectilinearly, progressively or degressively transverse to the insert direction of the tongue which means also at an incline at any desired angles, preferably, however, perpendicularly thereto because this design is most favorable for manufacturing reasons as well as for reasons of load. When under load, in such instances, no material transverse forces acting on the housing will occur.

The disengaging mechanism for this arrangement of the roller bodies may be designed in the form of a depressible lever or as a slide.

The greater the deviation from the vertical, the more friction causing transverse forces will have to be absorbed by the housing within the region of the tongue of the insert member or link.

With a considerable deviation from the vertical, it is, according to a further development of the invention, suggested symmetrically on the oppositely located side to provide additional latching elements in the manner described above. In this way, all occurring transverse forces are fully compensated for and an easy opening of the closure will be assured. As disengaging means or mechanism there is provided preferably a slide which extends over the locking housing, is springurged and is operable in inserting direction, and which is provided with corresponding control wedge-shaped surfaces.

If necessary, for indirect actuation, a key mounted on the lock housing may be arranged transverse to the insert direction, said key being operatively connected to said slide.

According to a further development of the invention, it is provided to arrange a recess in the bottom of a rectangular housing and in the tongue of the plug-in or insertion plate which recess extends longitudinally in the insert direction and is intended for receiving at least two roller bodies. The two roller bodies are loosely mounted in a key extending over the housing and being spring-urged, in such a way that they are guided between the housing bottom and the insert tongue. The engaging position of the roller bodies is advantageously limited on that inside of the lock which is located opposite the recess in the housing. The roller bodies are designed as rollers and approximately in the center of the longitudinal extension respectively comprise a groove for a cage-like connection in the disengaging mechanism. Slightly different from the just mentioned design is a modification according to which the roller bodies are supported by designing the ends as bearing pins so that they can be received for instance in bores between the jaws of the key made of synthetic material. Also a barrel-shaped design of at least one roller body which in engaging position rests against another roller body with corresponding counter profile may in cases where the tongue of the insert member laterally has a greater play, aid in obtaining a proper linear engagement of the locking elements in the case of load. It is a matter of course that the engaging surface on the housing as well as on the insert tongue are correspondingly designed convex and concave. With the embodiment according to which the lock housing is provided with bottom recesses, the center of curvature of the roller bodies should be located in engaging position within the region of the thickness of the tongues, especially between the lock bottom and half the thickness of the tongue, in order in case of load to exert a slight component upon the roller bodies which will aid in the locking force.

With all above described embodiments, it is provided that the insert tongue has its front edge provided with a bevel or slant by means of which the roller bodies can be pressed away when the insert tongue is plugged in.

It is also advantageous in the box-shaped housings to provide at least one ejector spring which continuously urges the insert tongue out of the lock and furthermore in engaging position sees to it that always a play-free locking is established.

Figure 2:
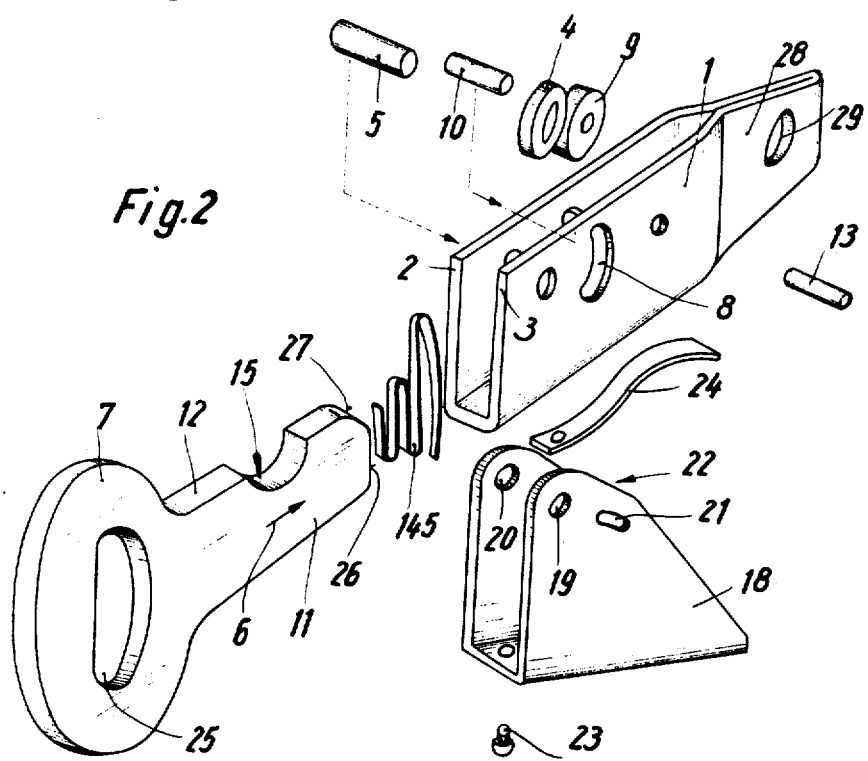
FIG. 2 shows an exploded view of the arrangement of FIG. 1 without the housing sections.

Referring now to the drawings in detail, FIGS. 1 to 24 illustrate various embodiments of closures for connecting safety belts. These closures must in response to an impact accident due to a retardation be able to absorb mass or inertia forces created by the person to be safeguarded and on the other hand after the process of retardation has finished must be able at any desired time easily to be engaged. Furthermore, the various disengaging mechanisms must according to the law be arranged in a countersunk manner and in the manner of a pressure key. FIGS. 1 and 2 illustrate a U-shaped housing 1 which is made as a single piece from a sheet metal cut. On the insert side, between the open U-legs 2 and 3, the supporting roller 4 is by means of a bearing pin 5 rotatably mounted on the housing 1. Substantially transverse to the insert direction 6 of the insert or plug-in member 7 there is provided a recess 8 on the housing 1 in both legs 2 and 3. Guided in this recess 8 is the roller body which is designed in the form of a roller 9. The roller body is guided with play in said recess 8 by means of a control pin 10 pressed into said roller body. The tongue 11 tangentially engages the insert member 7, when viewed in engaging position of FIG. 1, on the wide side 12 with slight play on the supporting roller 4 as well as on the pins 13 which are connected to the housing 1. The counter guiding of the tongue 11 is effected at the narrow inner side 14 of the housing 1. On that tongue side 12 which faces the supporting roller 4, there is provided a recess 15 which supports the roller 9 and is open at the rim, said recess 15 being at least so deep that when viewed in engaging position, the extending connecting straight line 16 between the points of rotation of the supporting roller 4 and the roller 9 will still lie within said recess. Outside the intersecting points 17 of the straight line 16 and recess 15, the recess surface extends perpendicularly with regard to the straight line 16 but advantageously converges outwardly for easy disengageability at an angle which is less than that of the self-locking angle.

The remaining portion of the recess 15 is so to be designed that the roller 9 will engage without clamping effect. The disengaging mechanism 18 extends in a U-shaped manner over the housing 1 and at the free legs is provided with bearing bores 19 and 20 for pivotally journalling on the bearing pin 5 which is connected to the housing. The U-shaped legs of the disengaging mechanism 18 are parallel to the bearing bores 19 and 20 provided with two additional recesses 21 and 22 in which there is mounted with play the control pin 10 of the roller 9. A flat-formed spring 24 is connected by means of a rivet 23 to the disengaging means 18 and is supported on the housing 1 while holding the roller 9 in engaging position. The flat plug-in member 7 is for connection of the belt designed in an eye-shaped manner 25 against the tongue side. At the front edge 26 of the insert tongue 11 there is provided an inclined surface 27 by means of which the roller 9 can be pressed away when inserting the insert tongue. The U-shaped legs of housing 1 are opposite the insert side plated together at 28 and are provided with a connecting bore 29 for connection, for instance, with the chassis.

Two cover cups 30 and 31, which are not illustrated in detail, cover the housing 1 and its individual parts.

During the disengaging operation, the disengaging mechanism 18 is actuated in the direction of the arrow 32 so that the roller 9 will, while correspondingly turning or performing a rolling movement, roll transverse to the outside on the support roller 4 and will properly free the intake or insert tongue 11.

FIGS. 3-8 illustrate a particularly simple arrangement of a closure according to the invention. The housing 33 is made as a single piece out of a rectangular-shaped sheet metal cut and is bent into a box shape so that the insert tongue 34 of the insert member 35 will be guided at all sides with slight play. For the sake of clearness, similar parts will be designated with the same reference numerals.

The front range of housing 33 is provided with a recess 36 which extends approximately transverse to the insert direction 6 of the inset tongue 4 and is open at the rim. The roller bodies 37 and 38 are guided in the recess 36, which roller bodies 37 and 38 are with play mounted in the movable disengaging mechanism 41, 42 which is under the load of the flat-formed spring 39, 40 respectively. On the locking side, the insert tongue 34 is provided at least with a recess 43 which is open at the rim and corresponds approximately to the housing recess 36. The supporting surfaces 44 on the insert tongue 34, 45 on the housing 33 and 46 may at any desired angle along a straight line, progressively or degressively transverse to the insert direction 6 of the insert member or tongue 34. However, as indicated in FIGS. 3-8, the vertical extension is advantageous for manufacturing reasons as well as for reasons of load.

Opposite the insert side, the housing 33 is by means of the bearing pin 47 connected to a cable connection 48 firmly connected to the chassis. The bearing pin 47 protrudes beyond the housing 33 and simultaneously serves for a pivotal mounting of a disengaging mechanism 41 which extends in a U-shaped manner over the housing 33. On the inner sides of the legs 49 and 50, there are viewed in engaging position provided longitudinal pockets 51 and 52 in which the roller bodies 37 and 38 are mounted in a cage-like manner with play. The flat form spring 39, which rests against the housing 33, is by means of a rivet 53 connected to the disengaging mechanism 41.

FIG. 5 shows in the form of an isometric view a complete closure with lock insert member 34 into which a belt member 54 is connected through the intervention of the eye 25. The housing 46 of the lock is within the region of the tongue guiding means designed in conformity with FIGS. 3 and 4. Merely the bottom member is extended toward the rear 55 and in this part comprises a connecting bore 56. The only modification of this closure is the slide-like design of the disengaging mechanism 42. This mechanism 42 extends in a U-shaped manner over the housing 46, while the inner sides of the legs 57 and 58 have longitudinal pockets 59 and 60 for cage-like receiving of the roller bodies 37 and 38. Perpendicularly to the cage-like pockets 59 and 60, the outsides of the disengaging mechanism 42 provided with guiding rails 61 and 62 which fit with play into corresponding counter grooves 63 and 64 in the housing cover 66 which is foldable by means of a film hinge 65. The disengaging mechanism 42 designed as a press slide is held in engaging position by means of a flat-formed spring 40 which rests against the housing 46. The foldable housing cover 66, which is made of a spring elastic synthetic material, is connected to the housing 46 by means of screws 67.

With both designs of the disengaging mechanisms, a proper locking function is assured.

When the locking support surfaces greatly deviate from a vertical plane, a design according to FIGS. 9-14 is suggested according to which on the opposite side there are symmetrically arranged additional locking elements which will now be described.

The housing 68 is bent rectangularly from a symmetric sheet metal cut. For receiving a connecting bore 69, the bottom is correspondingly extended unilaterally. In the flat insert member 70, within the region of the tongue 71, there are embossed small dogs 72 and 73 which during the insertion of the tongue on the longitudinal edges 74 and 75 of housing 68 of the insert member 70 yield a transverse guiding. Two housing perforations 77 and 78 are arranged symmetrically with regard to each other at an angle 76. These perforations 77 and 78 respectively guide with play two roller bodies 79 and 80 which are preferably of the same size. These roller bodies 79 and 80 are held in engaging position by pairs of grooves 81 and 82 extending in a wedge-shaped manner relative to each other and are held in engaging position in the spring loaded slide-shaped disengaging mechanism 83 which completely surrounds the housing 68. As a result thereof, the wedge angle 84 which is formed by two oppositely located housing perforations 77 and 78, as well as the wedge angles at the insert tongue 71 and disengaging mechanism 83, are of the same size and, more specifically, are twice as great as the angle 76. One leg of the angle 76 is formed by the member 76' which is perpendicular to the insert direction 6, and the other leg 76'' is formed by the member which is perpendicular to the connecting line 16' of the central lines of the roller bodies.

The pressure spring 85 which holds the disengaging mechanism 83 in engaging position, rests between the cover cup section 86 and the angled-off pressure rail 87 of the disengaging mechanism 83. A second cover cup 88 embraces the housing 68 in a non-illustrated manner. The disengaging direction of the slide-shaped disengaging mechanism 83 is substantially identical to the insert direction 6 of the insert member 70.

FIGS. 12, 13 and 14 illustrate a further development of the embodiment according to FIGS. 9, 10 and 11 with the requirement that the actuation of the disengaging mechanism is effected approximately in axial direction of the roller bodies. Insert member 70, housing 68, and the pairs 79 and 80 of the roller bodies therefore were taken over without changes in these figures. Merely at the housing 68 and, more specifically, at the top side thereof, there are additionally provided two recesses 88 and 89 in which the pressure key 90 is supported. The disengaging mechanism 91 corresponds as far as its inner design is concerned to the embodiment of FIGS. 9–11. The only material difference consists in that it is designed without the angled-off pressure rail 87. For this arrangement the narrow side of the disengaging mechanism is provided with grooves 92 and 93 which cooperate with control cams 94 and 95 of the pressure key 90 in such a way that in response to a depression of the pressure key 90, the slide moves in disengaging direction 6. Between the pressure key 90 and the slide-shaped disengaging mechanism 91 there is provided a pressure spring 96 which retains the pairs 79 and 80 of the roller bodies in engaging position.

This arrangement makes it possible with simple means to equip closures of the same fundamental structure only during the assembly with the respective disengaging mechanism while for the various different equipment elements merely very small inexpensive parts of synthetic materials such as key, disengaging mechanism and housing cover cups are necessary.

FIGS. 15–21 illustrate a closure with different structural modifications which is adapted to be placed into locking and unlocking position preferably perpendicularly with regard to the wide side of the housing. The housing 97 is bent of a symmetrically designed sheet metal cut into a box so that the tongue 98 of the insert member 99 on all sides with slight play guided in the housing 97.

Within the front region, in the bottom of the housing 97 as well as in the tongue 98, there is provided a recess 100, 101 preferably of rectangular shape which recess extends longitudinally in insert direction 6. This recess is intended for receiving two roller bodies 103, 104 which rest against each other and advantageously have the same dimensions. A disengaging mechanism which embraces the housing 97 on all sides and is designed in the form of a key 105 has its bottom side provided with a perforation 106 in which the roller bodies 103/104 are guided laterally with play. From the bottom 107 of the key 105 there projects a handle-like web 108 which keeps the roller bodies 103 and 104 in their central grooves 109 and 110 in upward direction and in longitudinal direction. The web 108 is set back relative to the outer surfaces of the roller bodies. The key 105 is closed from below by means of a form plate 111 so that the roller bodies 103 and 104 are on all sides in the manner of a cage guided in the key 105 with slight play. The pressure spring 112 presses the roller bodies 103 and 104 by means of the key 105 into engaging position which means upwardly to such an extent that the roller bodies engage the inner surface 113 located opposite the perforation 100 in the bottom. By pressing in the direction 114 upon the key 105, the roller bodies are through the intervention of the web 108 pulled downwardly, and the insert tongue 98 is disengaged or unlatched. An advantageous design of the locking mechanism is obtained according to FIG. 19 by providing bearing pins 115 and 116 on two preferably 'entical roller bodies 117 and 118 due to the fact that on the key 119 toward the inside there are arranged two jaws 120 and 121 provided with bearing bores. The roller bodies 117 and 118 are adapted to snap into said jaws 120 and 121 and by means of the bearing pins 115 and 116 are loosely guided in the key web.

A barrel-shaped design of at least one roller body 123, which rests in engaging position against a further roller body with corresponding counter profile 124 may be desirable in order to bridge a greater lateral play of the insert tongue. The engaging surfaces on housing 97 and on tongue 98 will in such an instance have to be convex 125 and concave 126, respectively.

With the designs provided with recesses in the bottom, the center of curvature 127 of the roller bodies 103, 104, 117, 118, 123 and 124 should in engaging position be located within the region preferably between the lock bottom and half the thickness of the tongue 128 in order in case of load to realize a closing force aiding effect.

Figure 22:
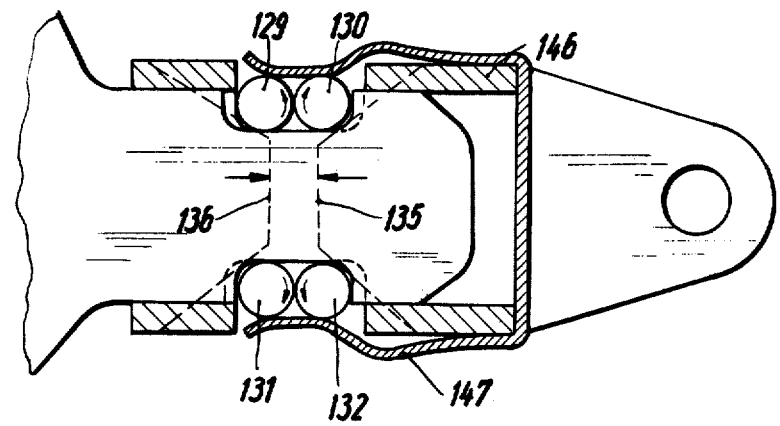
FIG. 22 is a partial section of a double locking means with antifriction bodies arranged parallel to each other.

FIG. 22 is a fragmentary section of a double locking mechanism with roller bodies 129, 130, 131 and 132 preferably of the same dimension which are arranged parallel to each other. Two slides 135 and 136 which are designed with wedge-shaped surfaces 133 and 134 in overlapping engagement operate against each other and bring about the disengagement. The slides 135 and 136 may be actuated directly or indirectly.

Figure 23:
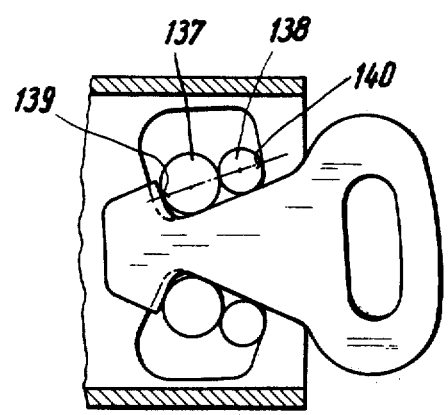
FIG. 23 shows a partial section of a double locking means with antifriction bodies arranged in a V-shaped manner relative to each other.

FIG. 23 is intended to show that also different diameters of the roller bodies 137 and 138 operatively connected to each other cannot affect the system. It is merely to be noted that the supporting surfaces 139 and 140 in engaging position are located perpendicularly with regard to the extended connecting straight lines between the axes of these roller bodies.

Figure 24:
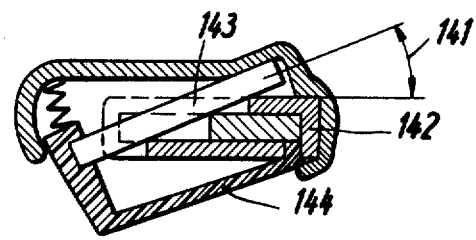
FIG. 24 is a cross section through still another locking means arrangement.

FIG. 24 shows a roller body locking mechanism which is at an acute angle 141 to the housing 142. The roller bodies 143 are of a pin-like design and are mounted in the spring-loaded key 144 and held in engaging position.

All of the closures referred to above may be equipped with an ejector spring 145 which rests against the housing and is operable to act upon the end face edge 26 of the insert tongue.

It is, of course, to be understood that the present invention is, by no means, limited to the specific showing in the drawing but also comprises any modifications within the scope of the appended claims.

What is claimed is:

1. A releasable latch, especially for passenger seat belts, comprising in combination; a housing having a slot, a member having a tongue insertable into the slot in the housing, notch means in the tongue substantially perpendicular thereto, roller bodies in the housing engageable with said notch means when the tongue is inserted into said slot to latch the said housing and the said member together, said roller bodies extending laterally to the length of the tongue and disposed for rolling engagement of the roller bodies with the tongue upon insertion of the tongue into the slot, said roller bodies rollingly engaging and lying in the path of said notch means, resilient means biasing said roller bodies in notch means engaging direction, and means for moving at least one of the said roller bodies for release thereof under rolling friction movement during initial opening against the bias of said resilient means in the direction of disengagement from said notch means and in direction transversely thereof.

2. A releasable latch especially for passenger seat belts, comprising; a housing having a slot, a member having a tongue insertable into the slot in the housing, notch means in the tongue substantially perpendicular thereto, roller bodies in the housing engageable with said notch means when the tongue is inserted into said slot to latch the said housing and the said member together, said roller bodies extending laterally to the length of the tongue and disposed for rolling engagement of the roller bodies with the tongue upon insertion of the tongue into the slot, said roller bodies rollingly engaging and lying in the path of said notch means, resilient means biasing said roller bodies in notch means engaging direction, and means for moving at least one of the said roller bodies against the bias of said resilient means in the direction of disengagement from said notch means and in direction transversely thereof, said notch means in said tongue being in the form of a notch formed in a lateral edge thereof, both of said roller bodies being receivable into said notch, said housing having a recess in which said roller bodies are disposed when in said notch, the end walls of said notch and recess which cooperate in holding said member and housing latched together being substantially perpendicular to a line joining the axes of said roller bodies.

3. A releasable latch according to claim 1 in which said housing comprises an outer U-shaped part and an inner tubular part connected thereto and within which said tongue is received.

4. A releasable latch according to claim 1 in which said tongue at the free end thereof comprises an incline for causing said roller bodies into retracted position during insertion of the tongue into the housing.

5. A releasable latch according to claim 1 which includes spring means in the housing and biasing the tongue outwardly from the housing.

6. A releasable latch, especially for passenger seat belts, comprising; a housing having a slot, a member having a tongue insertable into the slot in the housing notch means in the tongue substantially perpendicular thereto, roller bodies in the housing engageable with said notch means when the tongue is inserted into said slot to latch the said housing and the said member together, said roller bodies extending laterally to the length of the tongue and disposed for rolling engagement of the roller bodies with the tongue upon insertion of the tongue into the slot, said roller bodies rollingly engaging and lying in the path of said notch means, resilient means biasing said roller bodies in notch means engaging direction, and means for moving at least one of said roller bodies against the bias of said resilient means in the direction of disengagement from said notch means and in direction transversely thereof, said housing comprising an outer U-shaped part and an inner tubular part connected thereto and within which said tongue is received, said inner part having a lateral recess in one edge, said notch means in said tongue comprising a lateral notch in one edge which is in alignment with the notch in said inner part in inserted position of said tongue.

7. A releasable latch according to claim 6 in which said housing has a surface engageable with said roller bodies on one side while said notch means in the tongue has a surface engaging the roller bodies on the other side, said surfaces being generally perpendicular to the direction of insertion of said tongue into said housing.

8. A releasable latch according to claim 6 which includes a release member moveably supported by said housing and in turn operatively supporting said roller bodies and manually moveable for movement of the roller bodies into tongue disengaging position, said resilient means acting on said release member.

* * * * *